United States Patent
Irgens et al.

(10) Patent No.: US 7,267,355 B2
(45) Date of Patent: Sep. 11, 2007

(54) ANTI-ROTATIONAL HITCH BALL

(75) Inventors: Christopher Irgens, Elm Grove, WI (US); Frank Scott, Milwaukee, WI (US); John Zapushek, Racine, WI (US); Rolf Hohmann, Menomonee Falls, WI (US); Mark Van Handel, Milwaukee, WI (US); Craig Kottke, Grafton, WI (US); Christopher Rhode, West Allis, WI (US)

(73) Assignee: Master Lock Company LLC, Oak Creek, WI (US)

( * ) Notice: Subject to any disclaimer, the term of this patent is extended or adjusted under 35 U.S.C. 154(b) by 61 days.

(21) Appl. No.: 11/023,310

(22) Filed: Dec. 27, 2004

(65) Prior Publication Data

US 2005/0151349 A1    Jul. 14, 2005

Related U.S. Application Data

(62) Division of application No. 10/709,947, filed on Jun. 8, 2004.

(60) Provisional application No. 60/521,067, filed on Feb. 13, 2004, provisional application No. 60/481,028, filed on Jun. 26, 2003.

(51) Int. Cl.
*B60D 1/06* (2006.01)
(52) U.S. Cl. ..................................... 280/511
(58) Field of Classification Search ................ 280/511, 280/507, 415.1, 455.1, 491.5; 403/375, 383, 403/387, 379.5, 378, 356
See application file for complete search history.

(56) References Cited

U.S. PATENT DOCUMENTS

| 1,988,925 A | 1/1935 | Thomson |
| 1,996,128 A | 4/1935 | Thomson |
| 2,834,611 A | 5/1958 | Chenette |
| 3,014,332 A | * 12/1961 | Hubbard .................. 56/41 |
| 3,650,546 A | 3/1972 | Koenig |
| 3,679,234 A | 7/1972 | Colliau |
| 4,060,331 A | 11/1977 | Domer et al. |
| 4,201,400 A | 5/1980 | Hoogenbosch |
| 4,456,279 A | 6/1984 | Dirck |

(Continued)

FOREIGN PATENT DOCUMENTS

| CA | 474765 | 6/1951 |
| CA | 1216316 | 1/1987 |
| GB | 2 038 259 A | 7/1980 |
| GB | 2038259 | 7/1980 |
| WO | WO97/22484 | 6/1997 |
| WO | WO 02/48554 | 6/2002 |

OTHER PUBLICATIONS

SEMA Show Exhibitor, Kings Exports, "Simplified Ball Mount & Hitch Ball Assembly", 2003.*

(Continued)

*Primary Examiner*—Anne Marie Boehler
(74) *Attorney, Agent, or Firm*—Calfee, Halter & Griswold, LLP

(57) ABSTRACT

A hitch assembly that includes an anti-rotation mechanism. The hitch assembly generally includes a hitch ball, a ball mount, and a fastener. The invention is directed to a mechanism for preventing rotation of either the hitch ball or the fastener relative to the ball mount. The anti-rotation mechanism of the present invention provides an engagement means for interlocking sections of the hitch ball or fastener with the ball mount, thereby blocking rotation of the hitch ball or fastener relative to the ball mount.

11 Claims, 9 Drawing Sheets

U.S. PATENT DOCUMENTS

| | | | |
|---|---|---|---|
| 4,565,345 A | | 1/1986 | Templeman |
| 4,938,496 A | | 7/1990 | Thomas et al. |
| 4,993,739 A | | 2/1991 | Putnam |
| 5,040,817 A | | 8/1991 | Dunn |
| 5,044,652 A | | 9/1991 | Brisson |
| 5,085,452 A | | 2/1992 | Janeiro |
| 5,158,316 A | | 10/1992 | Hutchmacher |
| 5,501,542 A | | 3/1996 | Hall, Sr. |
| 5,531,537 A | * | 7/1996 | Pink et al. ............... 403/356 |
| 5,845,832 A | * | 12/1998 | Eichmann ............... 224/509 |
| 5,884,931 A | | 3/1999 | McCoy |
| 6,106,187 A | * | 8/2000 | Mina ............... 403/356 |
| 6,478,278 B1 | | 11/2002 | Duncan |
| 2002/0024194 A1 | | 2/2002 | Ross |
| 2004/0195804 A1 | | 10/2004 | Milazzo |
| 2005/0001408 A1 | | 1/2005 | Irgens et al. |
| 2005/0040623 A1 | | 2/2005 | Krespach et al. |

OTHER PUBLICATIONS

International Search Report from PCT/US2004/0020651.

Photographs of a Pintal Ball Mount produced by CURT, (date unknown, but more then 1 year before priority date of present application) (3 pages).

Bew Products 2004 Brochure, Highland, The Pro's Brand, Cequent Consumer Products. (2004) (1 page).

Photographs of Curt Manufacturing Company Ball Mount Assembly; Part No. E-19, Ball and Pintle Combination 2, Bar Code No. 12314-51900 (6 pages), date unknown.

* cited by examiner

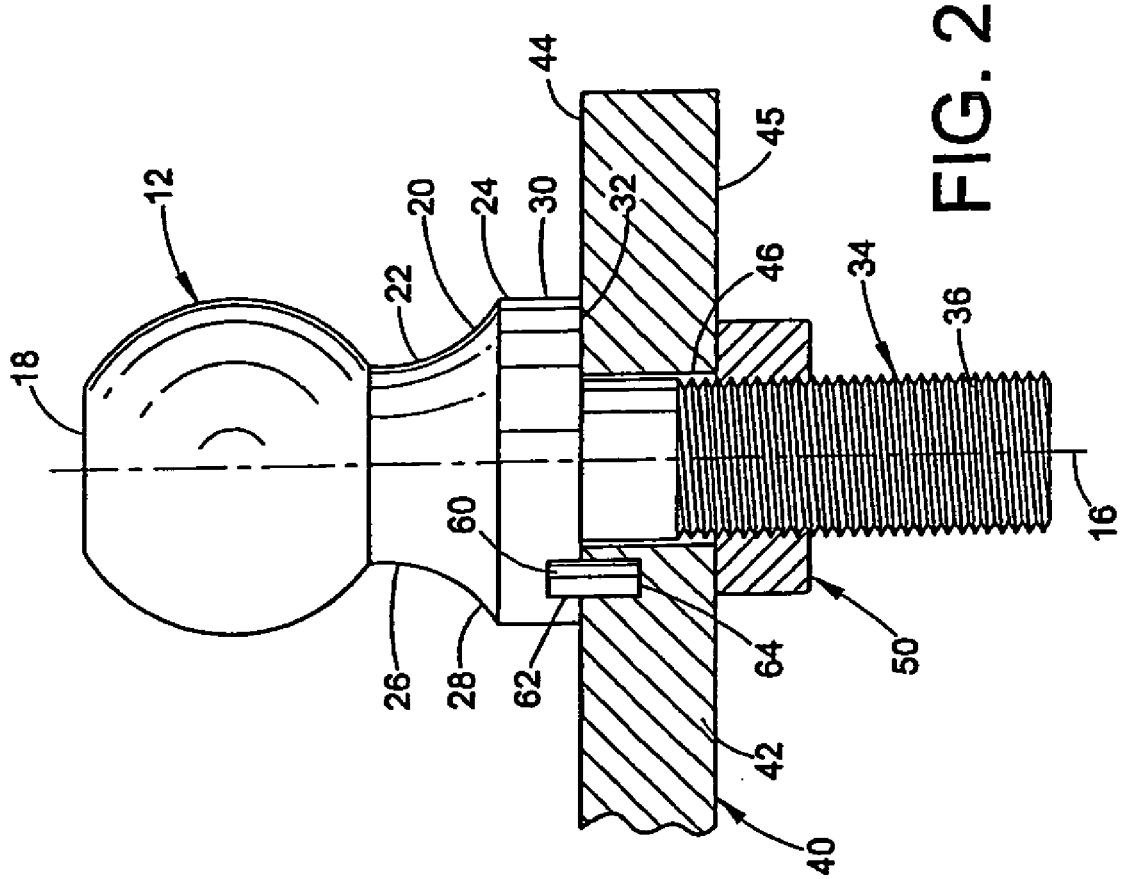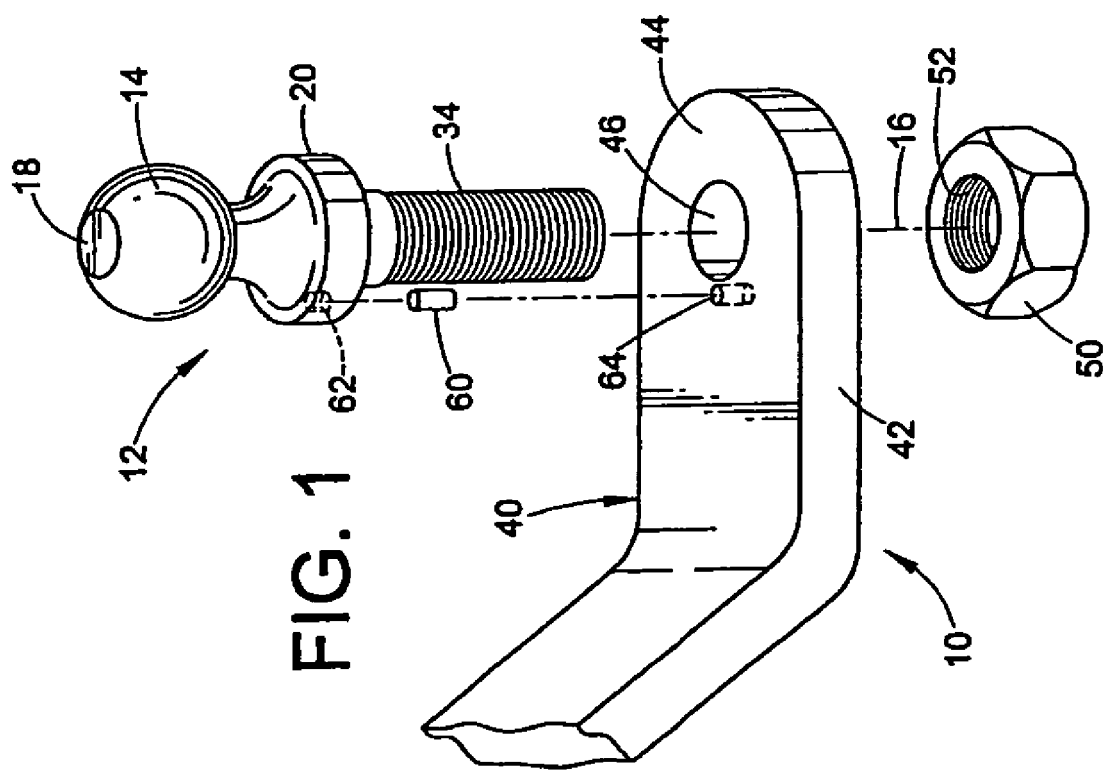

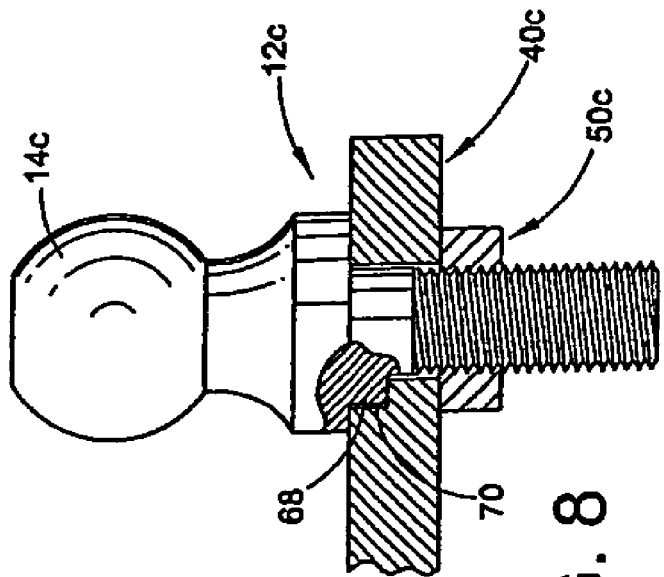
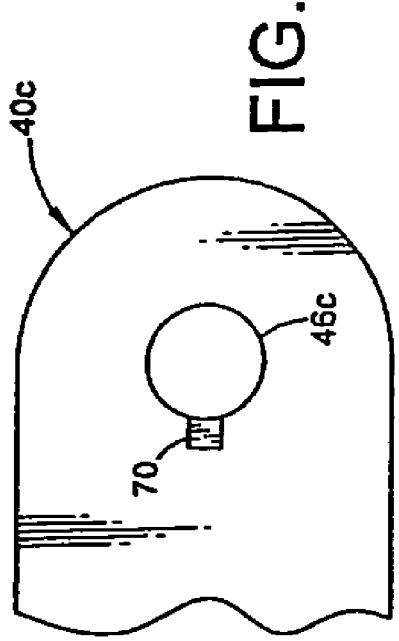
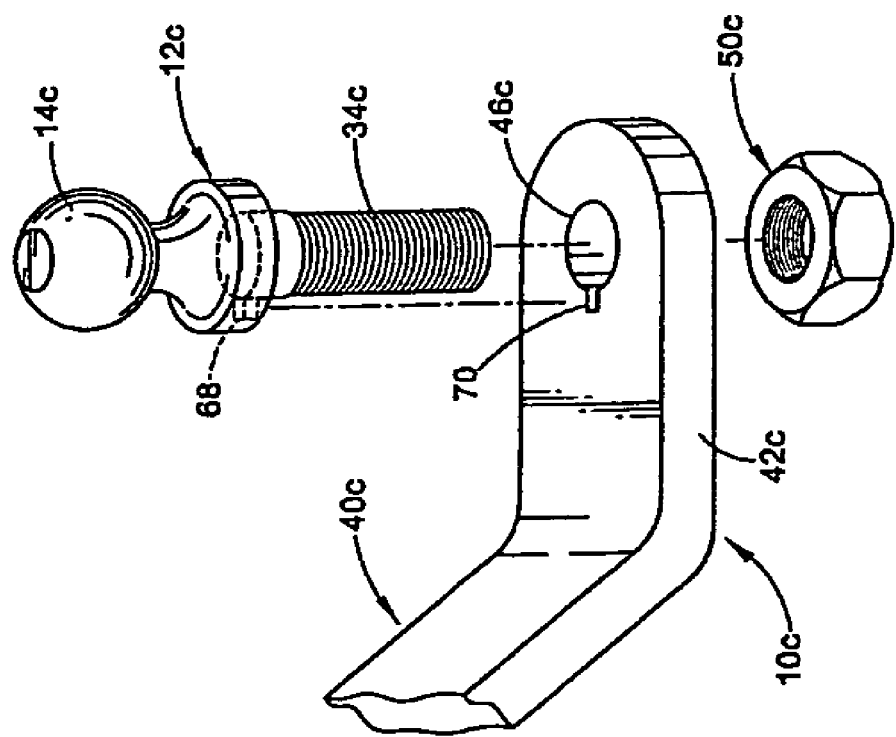

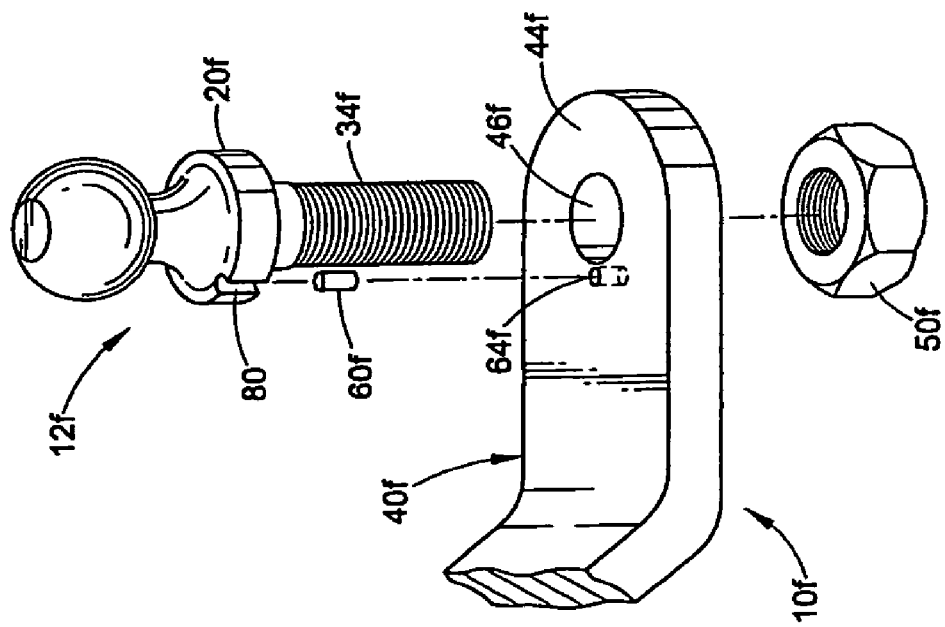
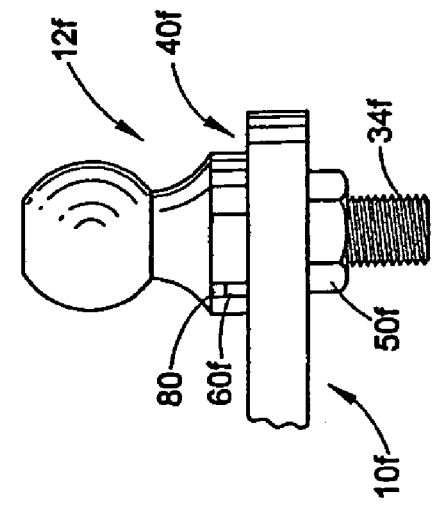
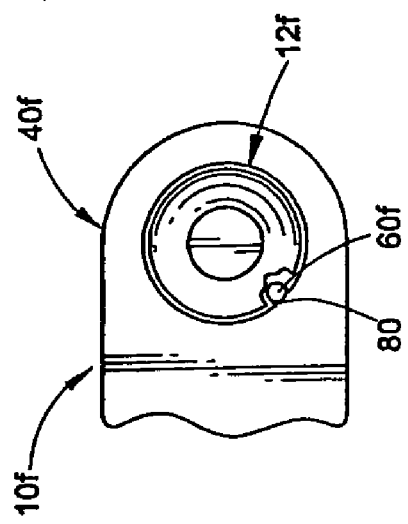
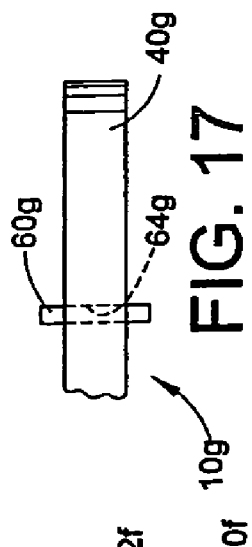
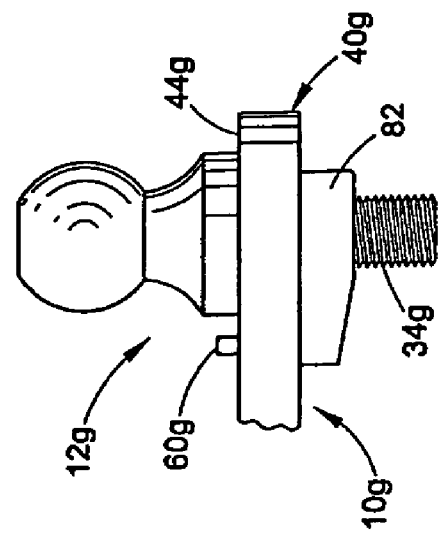
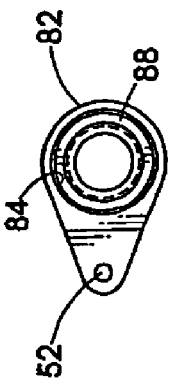

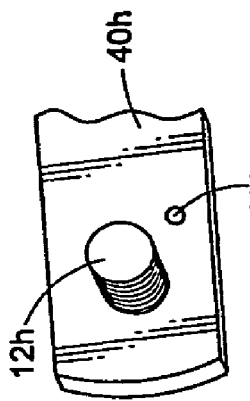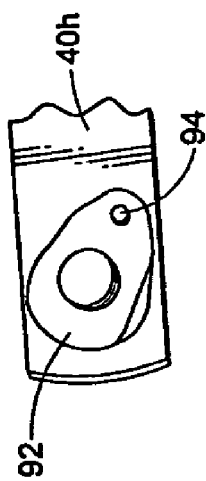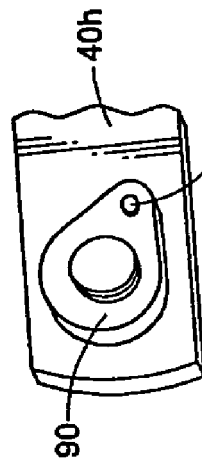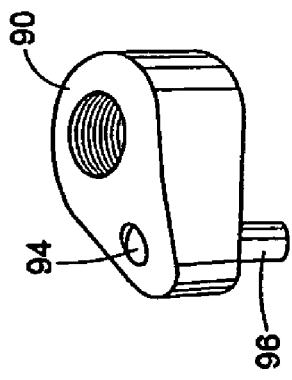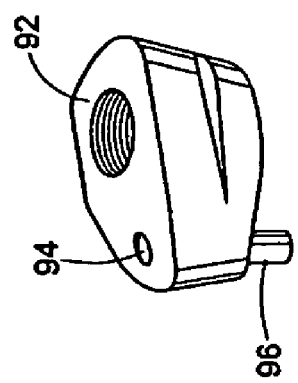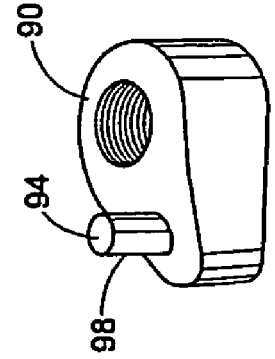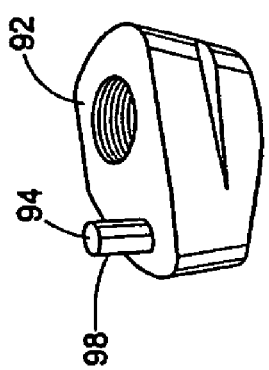

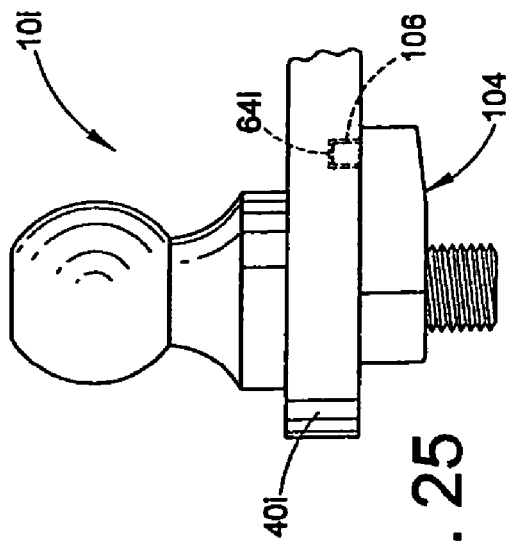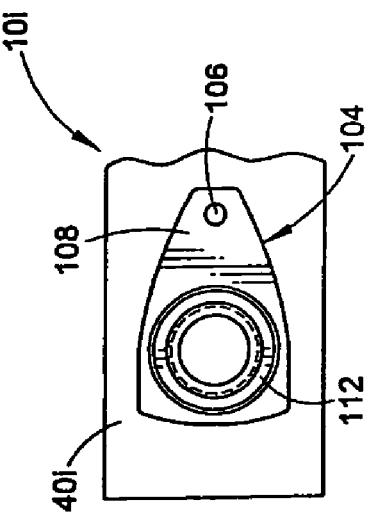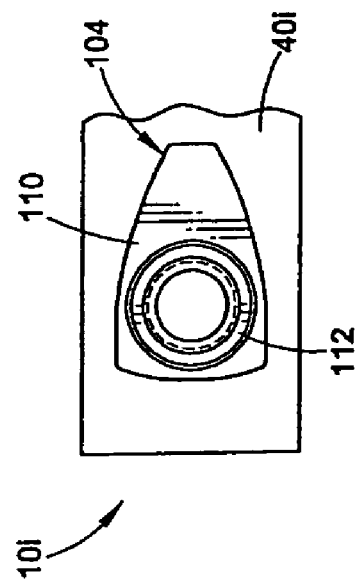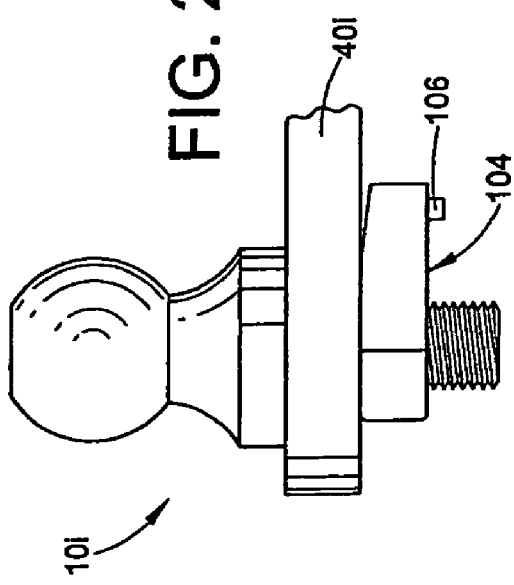
FIG. 24
FIG. 25
FIG. 26
FIG. 27

ANTI-ROTATIONAL HITCH BALL

REFERENCE TO PRIOR APPLICATION

"This application is a divisional application of application Ser. No. 10/709,947 filed Jun. 8, 2004, which claims priority to U.S. Provisional Patent Application Ser. No. 60/481,028 filed Jun. 26, 2003 and U.S. Provisional Patent Application Ser. No. 60/521,067 filed Feb. 13, 2004, the entire disclosures of which are hereby incorporated by reference."

BACKGROUND OF THE INVENTION

A hitch assembly connects a towing vehicle with a towed vehicle, such as a trailer. One common type of hitch assembly includes a hitch ball on the towing vehicle. The hitch ball is often removably mounted on a ball mount secured to the frame of the towing vehicle. The ball mount includes a through hole for receiving a shank portion of the hitch ball. The hitch ball is secured to the ball mount with a fastener that is threaded on the shank portion and tightened down against the ball mount.

During assembly, if the hitch ball is rotated by a wrench, socket driver, or other tool, the fastener tends to rotate along with it. Similarly, if the fastener is rotated by a tool, the hitch ball has a tendency to rotate also. Therefore, to tighten the hitch ball and fastener onto the ball mount, one of the hitch ball or fastener must be blocked from rotating relative to the ball mount while the other is rotated. Typically, this is accomplished by using two wrenches to grasp both the hitch ball and fastener. One wrench is used to hold either the hitch ball or the fastener stationary, while the other wrench is used to tighten down the other.

SUMMARY OF THE INVENTION

The present invention relates to a hitch assembly that includes an anti-rotation mechanism. The hitch assembly generally includes a hitch ball, a ball mount, and a fastener. The invention is directed to a mechanism for preventing rotation of either the hitch ball or the fastener relative to the ball mount. The anti-rotation mechanism of the present invention provides an engagement means for interlocking sections of the hitch ball or fastener with the ball mount, thereby blocking rotation of the hitch ball or fastener relative to the ball mount.

BRIEF DESCRIPTION OF THE DRAWINGS

The hitch assembly of the present invention may be more readily understood by reference to the following drawings. While certain embodiments are shown as illustrative examples of the hitch assembly, the scope of this application should not be construed as limited to these illustrative examples.

FIG. 1 is an exploded perspective view of a first embodiment of the hitch assembly of the present invention;

FIG. 2 is an elevation view of the first embodiment of the hitch assembly of the present invention shown in FIG. 1;

FIG. 7 is an exploded perspective view of an alternative embodiment of the hitch assembly that includes a key and corresponding keyway configuration;

FIG. 8 is a cross sectional elevation view of the alternative embodiment of the hitch assembly shown in FIG. 7;

FIG. 9 is a plan view of the alternative embodiment of the ball mount shown in FIG. 7;

FIG. 14 is an exploded perspective view of an alternative embodiment of the hitch assembly including a notch defined within the hitch ball flange;

FIG. 15 is a elevation view of the alternative embodiment of the hitch assembly shown in FIG. 14;

FIG. 16 is a cross-sectional plan view of the hitch assembly shown in FIG. 14;

FIG. 17 is an elevation view of an alternative embodiment of a ball mount;

FIG. 18 is an elevation view of an alternative embodiment hitch assembly utilizing an anti-rotation nut with the ball mount shown in FIG. 17;

FIG. 19 is a plan view of the nut of the alternative embodiment hitch assembly shown in FIG. 18;

FIG. 20A is a perspective view of an alternative embodiment nut with the shuttle pin in the engaged position;

FIG. 20B is a perspective view of an alternative embodiment nut with the shuttle pin in the engaged position;

FIG. 20C is a perspective view of the nut shown in FIG. 20A with the shuttle pin in the disengaged position;

FIG. 20D is a perspective view of the nut shown in FIG. 20B with the shuttle pin in the disengaged position;

FIG. 21 is a bottom plan view of an alternative ball mount including a blind pin receiving hole;

FIG. 22 is a bottom plan view of the ball mount shown in FIG. 21 with the nut shown in FIG. 20B installed;

FIG. 23 is a bottom plan view of the ball mount shown in FIG. 21 with the nut shown in FIG. 20A installed;

FIG. 24 is a bottom plan view of the ball mount with an alternative embodiment nut installed with the static pin engaged in the ball mount;

FIG. 25 is an elevation view of a hitch assembly including the nut shown in FIG. 24 with the static pin engaged in the ball mount;

FIG. 26 is an elevation view of a hitch assembly including the nut shown in FIG. 24 with the static pin not engaged in the ball mount;

FIG. 27 is a bottom plan view of the ball mount with the nut shown in FIG. 24 with the static pin not engaged in the ball mount;

DETAILED DESCRIPTION OF THE INVENTION

Figure 3:
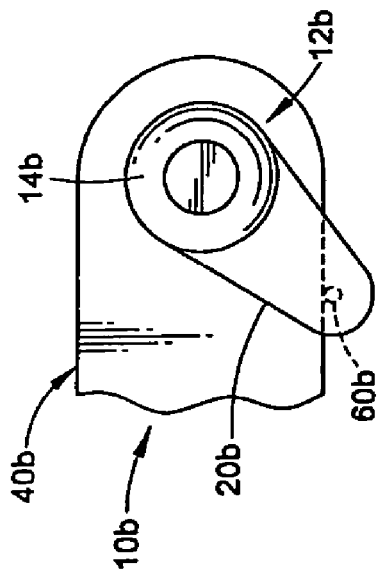
FIG. 3 is an exploded perspective view of an alternative embodiment of the hitch assembly of the present invention that includes a tear-shaped hitch ball flange.

The present invention can take the form of a number of embodiments, many of which are described herein. However, one skilled in the art should appreciate that other embodiments incorporating the invention described herein can be formed. The invention is directed to a hitch ball, a ball mount and a fastener and a mechanism for preventing rotation of either the hitch ball or the fastener relative to the ball mount. The anti-rotation mechanism provides an engagement means for interlocking sections of the hitch ball or fastener with the ball mount. The invention is best illustrated in the description of the embodiments below. As representative of the invention, FIGS. 1 and 2 illustrate a hitch assembly 10 constructed in accordance with a first embodiment of the invention.

The hitch assembly 10 includes a hitch ball 12. The hitch ball 12 shown in FIGS. 1 and 2 is described below. Generally, a standard hitch ball can be used providing that it is modified with or for the reception of one of the anti-rotation mechanisms disclosed herein. To that extent, the hitch ball 12 can be a new piece including such an anti-rotational modification, or it can be a standard hitch ball modified to include an anti-rotational piece. Such modified hitch balls allow for retrofitting.

The hitch ball 12 is preferably formed as one piece from a metal, such as stainless steel, although other suitable materials, such as plastic, can be used. Additionally, the hitch ball may be formed of multiple interconnecting pieces. The hitch ball 12 includes a ball portion 14 having a generally spherical configuration centered on a longitudinal axis 16 of the hitch ball. In the illustrated embodiment, the ball portion 14 has a flattened upper end surface 18, but this flattened surface is not required.

A flange portion, 20 of the hitch ball 12 extends from the ball portion 14. The flange 20 includes a flared section 22 and a cylindrical section 24. The flared section 22 of the flange 20 of the hitch ball 12 flares, that is, increases in diameter, from a smaller diameter part 26 adjacent the ball portion 14, to a larger diameter part 28 adjacent the cylindrical section 24.

The cylindrical section 24 of the flange 20 of the hitch ball 12 has a cylindrical outer side surface 30 centered on the axis 16. The cylindrical section 24 also has a planar, annular end surface 32 centered on the axis 16 and extending normal to the axis.

The hitch ball 12 includes a shank 34. The shank 34 extends from the end surface 32 of the flange 20 of the hitch ball 12, in a direction away from the ball portion 14. The shank 34 has a cylindrical configuration centered on the axis 16. The shank 34 has an external thread convolution 36.

It should be apparent to those skilled in the art that the hitch ball 12 could also be shaped or configured differently then described herein. For example, the entire flange 20 could be a cylindrical shape and not include a flared portion. Such modifications are contemplated and are included within this disclosure to the extent they are within the scope of the claims.

The hitch assembly 10 includes a ball mount 40. The ball mount 40 is a portion of the hitch assembly 10 that is fixed to the towing vehicle. In some applications, the vehicle must be fitted for the receipt of a ball mount 40. The ball mount 40 has a bar-like configuration including a body portion 42 that extends generally horizontal when the ball mount is mounted on the vehicle. The body portion 42 has an upper side surface 44 and a lower side surface 45.

A generally circular shank opening 46 is formed in the body portion 42 of the ball mount 40. The shank opening 46 extends completely through the body portion 42 of the ball mount 40. The shank opening 46 of the ball mount 40 is slightly larger in diameter than the shank 34 of the hitch ball 12. As a result, the shank 34 of the hitch ball 12 can be inserted freely through the shank opening 46 in the ball mount 40. When this is done, the hitch ball 12 is rotatable relative to the ball mount 40, about the axis 16.

The hitch assembly 10 also includes a fastener. In the illustrated embodiments, the fastener is a nut 50, but the fastener could also be a threaded cap, a wing nut or other type of fastener. The nut 50 has an internal thread convolution 52 that is engageable with the external thread convolution 36 on the shank 34 of the hitch ball 12.

The hitch assembly 10 also includes a mechanism for blocking rotation of the hitch ball 12 or fastener 50 relative to the ball mount 40. Generally, the mechanism includes a surface located on the hitch ball 12 or fastener 50 that interact with a surface on the ball mount 40 to prevent the rotation of either the hitch ball 12 or fastener 50 relative to the ball mount 40. With either the hitch ball 12 or fastener 50 blocked from rotating relative to the ball mount 40, only one tool is required to effectively tighten the other component.

In the embodiment shown in FIGS. 1 and 2, the mechanism includes a pin 60, a first pin opening 62 in the hitch ball 12, and a second pin opening 64 in the ball mount 40. The first pin opening 62 is formed in the flange 20 of the hitch ball 12. The first pin opening 62 has a cylindrical configuration, although other configurations are possible, extending parallel to the axis 16. The first pin opening 62 is located radially outward of the shank 34 The first pin opening 62 does not extend completely through the flange 20 of the hitch ball 12, but rather is formed as a bore extending only partially into the flange of the hitch ball.

The second pin opening 64 is formed in the upper side surface 44 of the body portion 42 of the ball mount 40. The second pin opening 64 has a cylindrical configuration, although other configurations are possible, extending parallel to the axis 16. In the illustrated embodiment, the second pin opening 64 does not extend completely through the body portion 42 of the ball mount 40, but rather is formed as a bore extending only partially into the ball mount. The second pin opening 64 is located radially outward of the shank opening 46. The second pin opening 64 is spaced apart from the shank opening 46 by the same distance that the first pin opening 62 is spaced apart from the shank opening when the hitch ball is installed through the shank opening.

The pin 60 is preferably formed of a rigid material, such as metal, although other suitable materials, such as plastic, can be used. The pin 60 has a cylindrical configuration with a diameter slightly smaller than the diameters of the first and second pin openings 62 and 64. Alternatively, the pin 60 may have an interference fit in one or both of the first and second pin openings 62 and 64. As shown, the pin 60 is cylindrical but, in general, the pin can be shaped in many configurations so long as it conforms to the shape of the first and second openings 62 and 64. The length of the pin 60 is slightly less than the combined lengths of the first and second pin openings 62 and 64.

The hitch assembly 10 is used by inserting the pin 60 into the first pin opening 62 in the hitch ball 12. The pin 60 could also be integrally formed with the hitch ball 12. In the embodiment shown in FIGS. 1 and 2, a portion of the pin 60 projects down from the flange 20 of the hitch ball 12.

The hitch ball 12 is then positioned on the ball mount 40 so that the shank 34 of the hitch ball extends into the shank opening 46 in the ball mount, and the pin 60 fits into the second pin opening 64 in the ball mount 40. The hitch ball 12 is moved axially into position on the ball mount 40, so that the end surface 32 of the hitch ball 12 is in abutting engagement with the upper side surface 44 of the ball mount.

The fastener 50 is screwed onto the projecting shank 34 of the hitch ball 12. In the embodiment shown in FIGS. 1 and 2, the fastener 50 is as nut. As the nut 50 is tightened on the hitch ball 12, the engagement of the pin 60 in the first and second pin openings 62 and 64 blocks rotation of the hitch ball 12 relative to the ball mount 40. As a result, the nut 50 can be tightened on the hitch ball 12, without the need for holding the hitch ball with a tool, such as a wrench. This embodiment provides for the complete encapsulation of the pin within the hitch ball and hitch mount, and therefore it is not cosmetically different from traditional ball mount assemblies. When assembled, it would not be visually apparent that the hitch assembly includes an anti-rotational feature.

FIG. 3 illustrates a hitch assembly 10*a* constructed in accordance with a second embodiment of the invention. Parts of the hitch assembly 10*a* that are the same or similar to parts of the hitch assembly 10 (FIGS. 1–2) are given the same reference numeral, with the suffix "a" attached.

The hitch assembly 10*a* (FIG. 3) includes a hitch ball 12*a*. The hitch ball 12*a* has a flange 20*a* that is not cylindrical in shape but instead has a teardrop shape including a radially projecting portion 66.

A first pin opening 62*a* is formed in the projecting portion 66 of the flange 20*a* of the hitch ball 12*a*. The first pin opening 62*a* is therefore spaced radially outward by a greater distance than the first pin opening 62 of the hitch ball 12 (FIGS. 1–2). A second pin opening 64*a* on the ball mount 40*a* is spaced radially outward by a greater distance than the second pin opening 64 of the ball mount 40. The pin 60*a* engages in the pin openings 62*a* and 64*a* to block rotation of the ball hitch 12*a* relative to the ball mount 40*a*. The pin 60*a* could be placed in the pin opening 64*a* of the ball mount 40*a* and the hitch ball 12*a* could be inserted into the ball mount 40*a* so its pin opening 62*a* engages the pin. During assembly, the pin 60*a* could also be inserted into the pin opening 62*a* of the hitch ball 12*a* first and then the hitch ball could be inserted into the ball mount 40*a*.

In the embodiment shown in FIG. 3, the flange 20*a* is tear-drop shaped to allow for the additional radial spacing of the first pin opening 62*a*. Other shapes may be used to provide this same feature, for example the flange 20*a* could be oval shaped. The increased radial spacing can provide an increased mechanical advantage as the pin 60*a* resists rotation of the hitch ball 12*a*. It can also provide an orientation feature so that the user can identify the location of the pin 60*a* (and the first pin opening 62*a*) from above when assembling the hitch ball 12*a* to the ball mount 40*a* with the pin. In addition, the radial spacing of the pin 60*a* allows the hitch ball 12*a* to be used with a conventional ball mount that does not include an anti-rotational feature.

Figure 5:
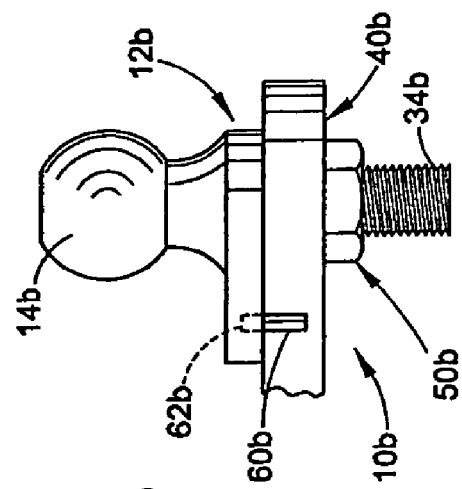
FIG. 5 is a top-view of the alternative embodiment of the hitch assembly shown in FIG. 4.
Figure 6:
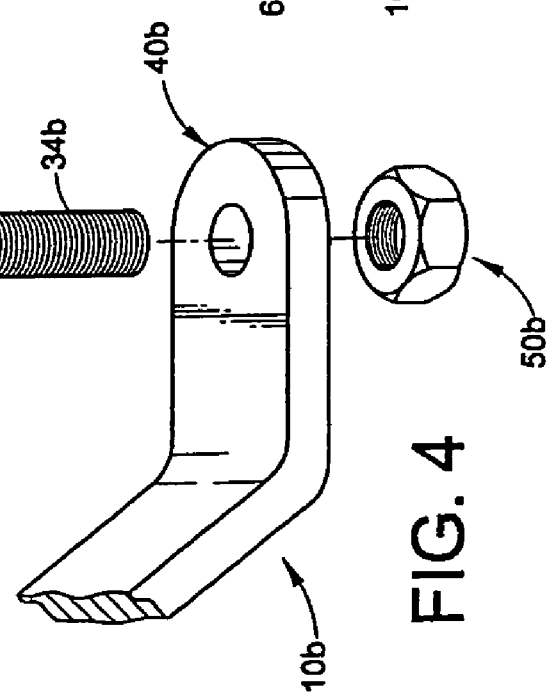
FIG. 6 is an elevation view of the alternative embodiment of the hitch assembly shown in FIG. 4.
Figure 4:
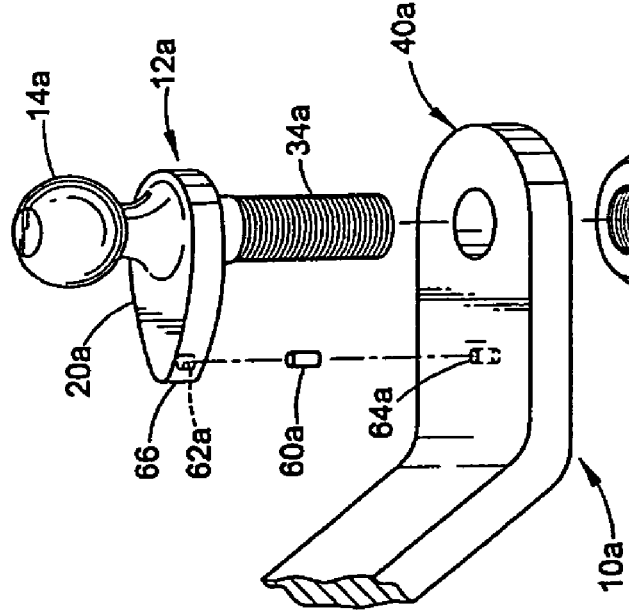
FIG. 4 is an exploded perspective view of an alternative embodiment of the hitch assembly of the present invention that includes a tear-shaped hitch ball flange and a pin that hangs over the side of the ball mount.

FIGS. 4–6 illustrate a hitch assembly 10*b* constructed in accordance with a third embodiment of the invention. Parts of the hitch assembly 10*b* that are the same or similar to parts of the hitch assembly 10 (FIGS. 1–2) are given the same reference numeral, with the suffixes "b" attached.

The hitch assembly 10*b* (FIG. 4–6) includes a hitch ball 12*b* and a ball mount 40*b*. The hitch ball 12*b* has a flange 20*b* that is not cylindrical in shape but instead has a teardrop shape including a radially projecting portion 66*b*.

A pin opening 62*b* is formed in the projecting portion 66*b* of the flange 20*b* of the hitch ball 12*a*. The pin opening 62*b* is therefore spaced radially outward by a greater distance than the first pin opening 62 of the hitch ball (FIG. 1–2). The pin 60*b* engages in the pin opening 62*b* in the flange 20*b* of the hitch ball 12*b*. The combination of the teardrop shape of the flange 20*b* and the location of the pin opening 62*b* allow the pin to hang off of the side of the ball mount 40*b*. When the hitch ball 12*b* is turned, the pin 60*b* engages a side portion 66 of the ball mount 40*b* to prevent relative rotation of the hitch ball 12*b* to the ball mount 40*b*.

In the embodiment shown in FIGS. 4–6, the flange is tear-drop shaped so that only a small portion of the flange extends beyond the edge of the ball mount. Other shapes may be used to provide the same feature, such as an oval or rectangular shaped flange. An advantage of this design is that the standard ball mount need not be altered, as the pin engages the side of the ball mount instead of a hole or recess in the ball mount. In an alternative embodiment, the pin 60*b* includes one or more flat surfaces that engage the surface of the ball mount 40*b* when the hitch ball 12*b* is mounted. In yet another embodiment, the section of the pin 60*b* that engages the ball mount 40*b* is coated or padded to prevent the scratching of the ball mount.

FIGS. 7–9 illustrate a hitch assembly 10*c* constructed in accordance with a fourth embodiment of the invention. Parts of the hitch assembly 10*c* that are the same or similar to parts of the hitch assembly 10 (FIGS. 1–2) are given the same reference numeral, with the suffix "c" attached.

An additional embodiment of the present invention includes a recessed portion that extends from the shank opening 46 of the ball mount 40. The recessed portion is configured to receive a mating piece that is located on either the hitch ball 12 or the fastener 50. The mating piece that is located on the hitch ball 12 or fastener 50 engages with the recessed portion located on the ball mount to prevent rotation of the hitch ball or fastener relative to the ball mount. The recessed portion could vary in size from a small recessed portion on the ball mount to a larger recessed portion that extends around a greater portion of the shank opening 46.

One example of this embodiment is displayed in FIGS. 7–9. The hitch assembly 10*c* includes a ball mount 12*c*. The shank portion 34*c* of the hitch ball 12*c* has a mating portion 68 in the shape of a male key. In the embodiment shown in FIGS. 7–9, the mating protrusion 68 has a rectangular cross section, but other shapes and configurations could be used, such as a rounded protrusion with a semi-circular cross-section. The ball mount 40*c* has a corresponding recessed portion 70 which is in the shape of a keyway extending from the shank opening 46*c*. The recessed portion 70 only passes through a section of the body portion 42*c* of the ball mount 40*c*. Due to the fact that the shank opening 46*c* extends completely through the body portion 42*c*, the recessed portion 70 only extends from a portion of the shank opening 46*c*. In the embodiment shown in FIGS. 7–9, the recessed portion 70 is a notch with a rectangular cross-section that is defined in the body portion 42*c* of the ball mount; however, the recessed portion 70 could be shaped and configured in many different ways, such as a semi-circular cut-out. The recessed portion 70 could be a small portion, or a larger portion extending generally around the circumference of the shank opening 46. The mating portion 68 on the hitch ball 12c is receivable in the recessed portion 70 of the ball mount 40c to block rotation of the hitch ball 12c relative to the ball mount 40c.

Figure 11:
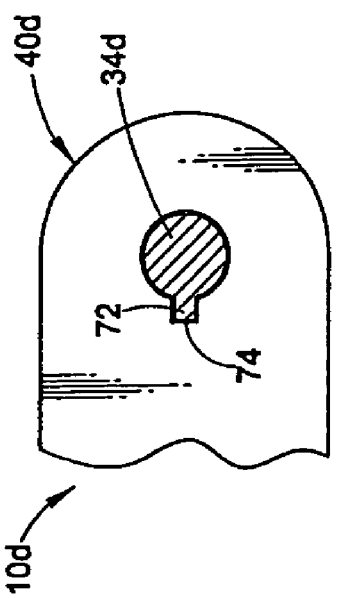
FIG. 11 is a cross-sectional plan view of the hitch assembly shown in FIG. 10.
Figure 10:
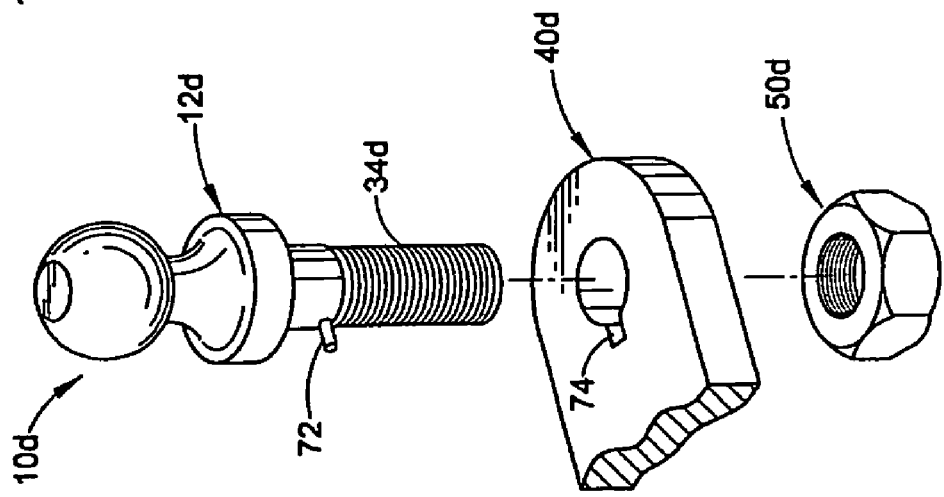
FIG. 10 is an exploded perspective view of an alternative embodiment of the hitch assembly that includes a horizontal pin projecting from the hitch ball.

FIGS. 10–11 illustrate a hitch assembly 10d constructed in accordance with a fifth embodiment of the invention. Parts of the hitch assembly 10d that are the same or similar to parts of the hitch assembly 10 (FIGS. 1–2) are given the same reference numeral, with the suffix "d" attached.

The hitch assembly 10d shown in FIGS. 10–11 illustrates another example of an extended recess used as an anti-rotational mechanism. The hitch assembly 10d includes a hitch ball 12d. The shank portion 34d of the hitch ball 12d has a horizontal pin 72 extending radially outward from the shank portion of the hitch ball. The pin 72 can be removable from the shank portion 34d or can be integrally formed with the shank portion 34d of the hitch ball 12d. A slot 74 is defined within the ball mount 40d. The horizontal pin 72 on the shank portion 34d of the hitch ball 12d is receivable in the corresponding slot 74 of the ball mount 40d to block rotation of the hitch ball relative to the ball mount.

Figure 12:
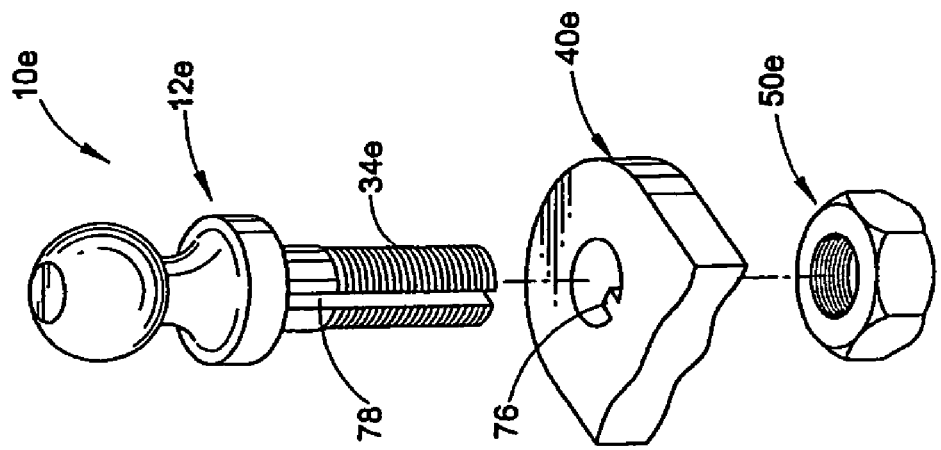
FIG. 12 is an exploded perspective view of an alternative embodiment of the hitch assembly including a key and corresponding keyway configuration.
Figure 13:
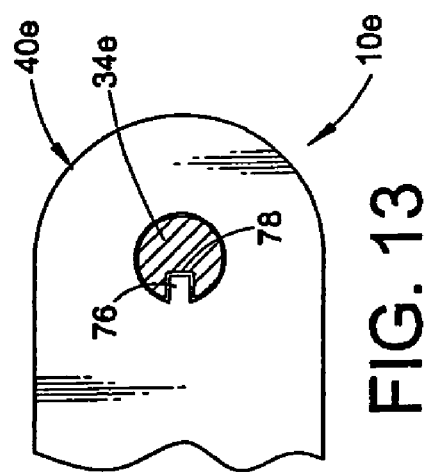
FIG. 13 is a cross-sectional plan view of the hitch assembly shown in FIG. 12.

FIG. 12–13 illustrate a hitch assembly 10e constructed in accordance with a sixth embodiment of the invention. Parts of the hitch assembly 10e that are the same or similar to parts of the hitch assembly 10 (FIGS. 1–2) are given the same reference numeral, with the suffix "e" attached.

The hitch assembly 10e (FIG. 12–13) includes a hitch ball 12e. A male key 76 is attached to the ball mount 40e. The key 76 can be removable from the ball mount 40e or it can be integrally formed with the ball mount. In the embodiment shown in FIGS. 12–13, the key 76 is a protrusion with a rectangular cross section, but other shapes and configurations could be used, such as a rounded protrusion with a semi-circular cross-section. The key 76 can be a small piece or it could extend down the length of the shank opening 46.

A corresponding keyway 78 is defined within the shank portion 34e of the hitch ball 12e. In the embodiment shown in FIGS. 12–13, the keyway 78 is a notch with a rectangular cross-section; however, the keyway 78 could be shaped and configured in many different ways, such as a semi-circular cut-out The male key 76 on the ball mount 40e is receivable in the keyway 78 of the shank portion 34e of the hitch ball 12e to block rotation of the hitch ball 12e relative to the ball mount 40e as shown in FIG. 13.

FIGS. 14–16 illustrate a hitch assembly 10f constructed in accordance with a seventh embodiment of the invention. Parts of the hitch assembly 10e that are the same or similar to parts of the hitch assembly 10 (FIGS. 1–2) are given the same reference numeral, with the suffix "f" attached.

The hitch assembly 10f (FIGS. 14–16) includes a hitch ball 12f. A pin opening 64f is defined in the ball mount 40f of the hitch assembly 10f. The pin 60f engages in the pin opening 64f.

A notch, slot or recess 80 is defined in a portion of the hitch ball flange 20f such that when the shank portion 34f of the hitch ball 12f is inserted through the shank opening 46f of the ball mount 40f, the notch, slot or recess aligns with the pin 60f on the ball mount. The hitch assembly 10f could include one recess 80 or it could include multiple such recesses. The engagement of the notch, slot or recess 80 with the pin 60f prevents the hitch ball 12f from moving relative to the ball mount 40f during the installation or removal of the hitch ball.

The pin 60f can be visible after installation of the hitch ball 12f. The visually perceptible pin 60f allows the user to recognize when the anti-rotation feature is engaged. The location of the pin 60f on the ball mount 40f can be either close to the shank opening 46f or further away. When the pin 60f is located a sufficient distance away from the shank opening 46f, traditional hitch balls can be used because the pin does not interfere with the operation of the traditional hitch balls.

Additionally, the fastener of the present invention can be adapted to include an anti-rotation feature. Illustrative examples of these embodiments are shown in FIGS. 17–31. Frequently, with hitch assemblies, the hitch ball is driven by a wrench or other tool while the fastener is held stationary with another wrench or tool. Many hitch balls include wrench flats or socket drivers so they can be installed using a driving mechanism. Since the hitch ball is often the active piece of the hitch assembly, additional embodiments of the invention include fasteners that are adapted to prevent rotation of the fastener relative to the ball mount. Consequently, the installer will be able to install the hitch ball with only one tool; using the tool to drive the hitch ball 12 while the fastener 50 is held stationary.

In addition, when using such a configuration, it is desired that the fastener should be unable to be torqued after installation. If the fastener were torqued, the anti-rotational mechanism could be damaged. For this reason, many of the embodiments including anti-rotational fasteners also include an anti-tamper feature that help prevent the fastener from being turned, or otherwise tampered with after installation. These anti-tamper fasteners could be combined with a hitch ball utilizing a security key socket driver, to serve as a type of hitch lock. Since the fasteners cannot be turned and the hitch ball could only be rotated by a custom formed socket, the hitch assembly could not be unassembled without the custom formed socket.

FIGS. 17–19 illustrate a hitch assembly 10g constructed in accordance with an eighth embodiment of the invention that includes a nut 82 adapted to prevent rotation. Parts of the hitch assembly that are the same or similar to parts of the hitch assembly 10 (FIGS. 1–2) are given the same reference numeral, with the suffix "g" attached.

The hitch assembly 10g (FIGS. 17–19) includes a hitch ball 12g. A pin opening 64g is defined in the ball mount 40g of the hitch assembly 10g. The pin 60g engages in the pin opening 64g.

The hitch assembly 10g includes a nut 82. A pin opening 52 is defined within the surface of the nut 82. The pin opening 52 is adapted to receive the pin 60g of the ball mount 40g. The pin 60g prevents the nut 82 from moving relative to the ball mount 40g during the installation of the hitch ball 12g. This allows the installer to turn the hitch ball 12g with a wrench or other driver while the nut 82 remains stationary. A lock washer pocket 84 is defined in the mounting face of the nut 82 and holds a lock washer 88 in place. Alternative embodiments of this nut 82 may not include this lock washer pocket 84 and lock washer 88

The nut in the embodiment shown in FIGS. 17–19 also provides an anti-tampering feature. The shape of the nut 82 is configured in a manner that would make it difficult to torque the nut. The tear drop shape of the nut would make it difficult to apply torque to the nut with a tool, such as a wrench, since there are no flat grabbing surfaces. Other nut configurations and shapes could be employed to achieve this same anti-tamper function. If so desired, a trim piece (not shown), such as a plastic piece, could be used to cover the portion of the pin extending from the top surface of the ball mount 44g, thereby making the assembly more attractive.

FIGS. 20–23 illustrate two additional nuts 90 and 92 that could be used to provide the anti-rotational nut feature. These nuts include a shuttle pin 94 that could be moved to and from an engagement position 96. FIGS. 20A and 20B illustrate the nuts 90 and 92 with the shuttle pin 94 protruding in the engaged position 96, while FIGS. 20C and 20D illustrate the nuts 90 and 92 with the shuttle pin retracted into the disengaged position 98. The difference between nut 90 illustrated in FIG. 20A and the nut 92 illustrated in FIG. 20B is that nut 92 includes a set of wrench flats, while nut 90 is a teardrop shape and does not include any wrench flats. Other differently configured and shaped nuts could also be used to provide this feature.

The nuts utilizing the shuttle pin feature engage with the ball mount 40h as shown in FIGS. 21–23. With these embodiments, a blind pin receiving hole 100 is defined within the ball mount 40h that receives the shuttle pin 94 of the anti rotational nut when the shuttle pin is in the engagement position 96. When it is desired that the nut 90 or 92 remain stationary, the shuttle pin 94 is placed in the engagement position 96 and inserted into the blind pin receiving hole 100 during installation. If it is desired that the nut 90 or 92 should rotate freely or if the ball mount 40h being used does not include a pin receiving hole, the shuttle pin 94 is placed in the disengagement position 98. The engagement of the shuttle pins 94 in the blind pin receiving hole 100 prevents the nuts 90 or 92 from moving relative to the ball mount 40h when the hitch ball 12h is rotated.

The blind pin receiving hole 100 totally receives the engagement portion 102 of the shuttle pin 94 but the shuttle pins is not accessible or visible from the upper side of the ball mount 40h. This configuration gives the hitch assembly 10h an improved appearance and also prevents access to the shuttle pin 94 of the nut 90 or 92 while the hitch ball 12h is installed. Since the shuttle pin 94 is inaccessible when the hitch ball 12h is installed the nut 90 or 92 cannot be tampered with while the hitch ball is installed.

FIGS. 24–27 illustrate an additional embodiment of a hitch assembly 10i including a nut with an anti-rotational feature 104. The nut 104 includes a static pin 106 protruding outward from the engagement surface 108 of the nut. This static pin 106 is received by the pin receiving hole 64i of the ball mount 40i to prevent the movement of the nut 104 relative the ball mount. If it is desired that the nut remain stationary, the engagement surface 108 is placed against the ball mount 40i and the static pin 106 is inserted into the pin receiving hole 64i of the ball mount. If it is desired that the nut 104 freely rotate or if the ball mount being used does not include a pin receiving hole, the non-engagement surface 110 of the nut is placed against the ball mount 40i with the engagement surface 108 and static pin 106 facing away from the ball mount. Recesses 112 adapted for receiving lock washers are defined within both the engagement surface 108 and non-engagement surface 110 of the nut 104. This allows a lock washer to be used regardless of whether the engagement surface 108 or non-engagement surface 110 of the nut 104 is facing the ball mount 40i during installation. Alternative embodiments of the nut 104 may not include these recesses.

With each of the embodiments of the present invention utilizing a pin 60, the pin could be integrally formed in the hitch ball 12, or fastener 50 and engage with the ball mount 40. Also, the pin could be integrally formed in the ball mount 40 and engage with the hitch ball 12 or fastener 50. Alternatively, the pin 60 may be positioned in one of the ball mount 40, hitch ball 12 or fastener 50 and then the components of the hitch assembly 10 could then be fitted together so the pin properly engages the desired components.

The pins 60 that are used by the various embodiments of the present invention could be replaced by a protrusion. The protrusion could be configured and shaped in multiple ways, such as a pyramid or dome shaped protrusion. The protrusion could be located on either the hitch ball 12 or the ball mount 40 and engage with a corresponding recess formed in the other of the hitch ball or ball mount to prevent rotation of the hitch ball in relation to the ball mount. Alternatively, the protrusion could be located on either the ball mount 40 or the fastener 50 and engage with a corresponding recess formed in the other of the ball mount or fastener.

The present invention also includes methods that allow its components to be used with other conventional hitch assembly components that are not similarly adapted for anti-rotation. These methods, such as a pin that can be moved between multiple positions, could also be utilized by the installer to disengage the anti-rotational mechanism of the hitch assembly if it is not needed.

Figure 28:
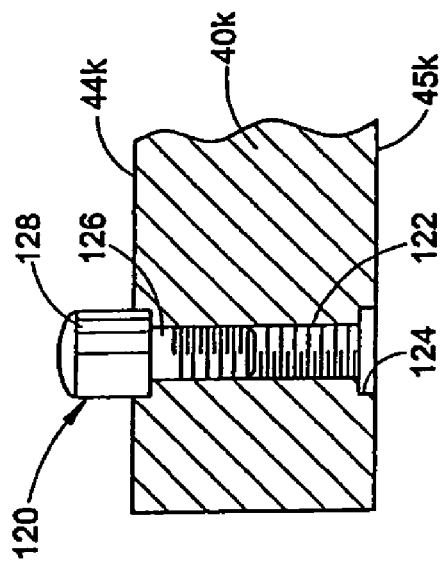
FIG. 28 is a cross-sectional plan view of an alternative embodiment ball mount including a set screw.

FIG. 28 illustrates a ball mount 40j including a set screw mechanism that can be utilized to move the pins of the present invention between various positions and lock it in a desired position. A pin receiving hole 64j and set screw receiving hole 114, which abuts the pin receiving hole, are defined within the ball mount 40j. The pin 60j is received in the pin receiving hole 64j of the ball mount 40j and the set screw 116 is received within the set screw receiving hole 114.

The set screw mechanism in FIG. 28 can be used to lock the pin 60j into two positions, a raised position and a dropped position. The raised position allows for engagement of the pin 60j located in the ball mount 40j with the hitch ball (not shown) as it is raised from the surface of the ball mount. To locate the pin 60j in the raised position, the pin is situated in the raised position and the set screw 116 is tightened, thus locking the pin into position. When the pin 60j is not to be used, the set screw 116 is loosened, allowing the pin to be moved to the dropped position. When the pin 60j is in the dropped position it can be flush with the top surface 44 of the ball mount 60j and project from the bottom surface 45 of the ball mount. Also, the pin 60j could also be totally encapsulated within the ball mount 40j and be flush with both the top surface 44 and bottom surface 45 when it is in the dropped position. The set screw 116 can be retightened to secure the pin 60i in the dropped position. Grooves 118 can be defined in the pin 60i to help secure the pin in position and further assist in locating the pin in its proper position, but these grooves are not required.

Figure 29:
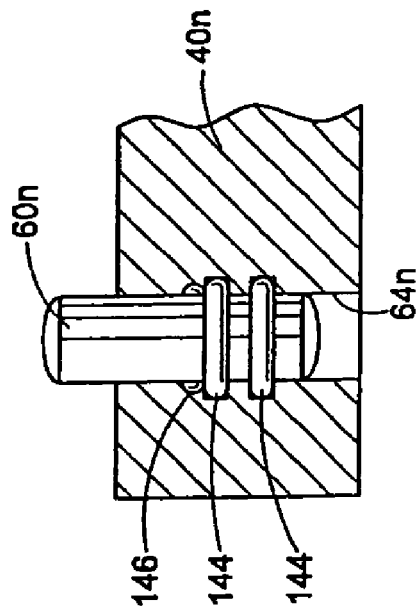
FIG. 29 is a cross-sectional plan view of an alternative embodiment ball mount including a threaded pin.

FIG. 29 illustrates a similar embodiment that utilizes a threaded pin 120. A threaded pin receiving hole 122 is defined within the ball mount 40k. A pin crown receiving hole 124 is defined within the upper surface 44k and lower surface 45k of the ball mount 40k. The diameter of the pin crown receiving hole 124 is larger than the diameter of the pin receiving hole 122. The pin crown receiving hole 124 is helpful in locating the pin, but it is not required and this embodiment would be effective without it. The threaded pin 120 includes a threaded portion 126 and an unthreaded crown portion 128. The crown portion 128 of the pin has a larger diameter than the threaded portion 126. The threaded portion 126 of the threaded pin 120 engages with the threaded pin receiving hole 122 of the ball mount 40k. The crown portion 128 of the threaded pin 120 is received by the pin crown receiving hole 124 of the ball mount 40k. As the threaded pin 120 is threaded into the pin receiving hole 122 of the ball mount 40k, the crown portion 128 contacts the surface of the ball mount. This helps locate the threaded pin 120 in the proper position and prevents the threaded pin from being screwed in further than it should be. It is not required that the pin 120 include a crown portion 128 or that the ball mount 40k include a pin crown receiving hole 124, but this configuration is helpful in locating the pin.

The threaded pin 120 could be threaded into the upper surface 44k of the ball mount 40k to engage a hitch ball equipped with a pin receiving hole or it could be threaded into the lower surface 45k of the ball mount 40k to engage a nut so equipped. Additionally, when the anti-rotation mechanism is not to be used, the threaded pin 120 can be removed all together or it could be threaded into a side of the ball mount 40k where it would not interfere with the installation of the hitch assembly 10k. Having the pin receiving hole 122 on both the upper surface 44k and the lower surface 45k of the ball mount 40k provides a convenient storage location for the threaded pin 120 when it is not in use.

Figure 30:
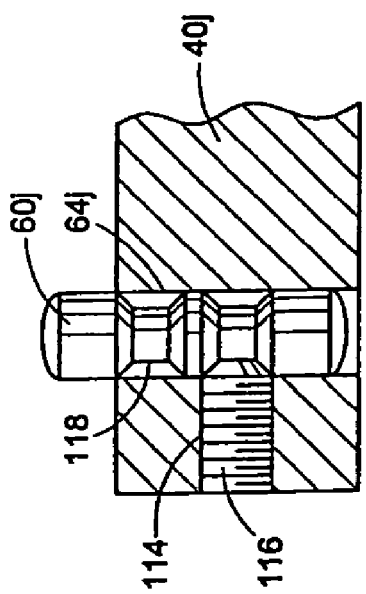
FIG. 30 is a cross-sectional plan view of an alternative embodiment ball mount including a plunger pin.

FIG. 30 illustrate an additional embodiment that utilizes a plunger pin design to facilitate the positioning of the pin. A plunger pin receiving hole 64m and a detent receiving hole 132, which abuts the plunger pin receiving hole, are defined within the surface of the ball mount 40m. The plunger pin 60m is received within the plunger pin receiving hole 64m of the ball mount 40m and a spring-biased detent 136 is received within the detent receiving hole 132. The plunger pin 60m can be manually forced into a raised position, in which it interferes with a portion of the hitch ball 12m (not shown), or a dropped position, in which it does not interfere with the hitch ball. As shown in FIG. 30, an upper groove 138 and a lower groove 140, are defined within the surface of the pin 60m. These grooves correspond to the raised position and the dropped position and are adapted to accept the spring biased detent 136. However, these grooves are not required. These grooves 138 and 140 may include a camming surface 142, which allows the detent 136 to move into and out of the grooves upon the application of pressure. If the pin 60m was in the dropped position and was totally encapsulated within the ball mount 40m it may be necessary to include a way to retrieve the pin from within the ball mount. Accordingly, additional embodiments of the pin 60m could include a springing mechanism configured in such a manner that when the pin is pushed down it is released and allowed to spring to a raised position (not shown).

When the pin 60m is in the raised position, application of a downward force will force the detent 136 out of the lower groove 140 and into the upper groove 138, which corresponds to the dropped position. To move the pin 60m back to the raised position, an upward force is applied to the pin. The upward force moves the detent 136 from the upper groove 138 to the lower groove 140, which corresponds to the raised position.

Figure 31:
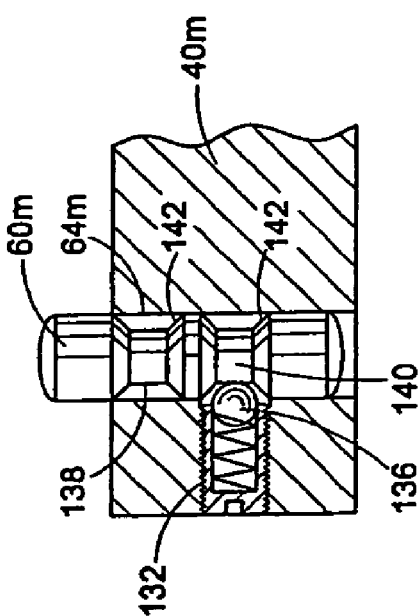
FIG. 31 is a cross-sectional plan view of an alternative embodiment ball mount including an interference fit pin.

FIG. 31 illustrates another pin embodiment of the present invention. In this embodiment, the pin receiving hole 64n of the ball mount 40n houses a pair of interference rings 144 that correspond with a raised position and a dropped position. Various numbers and configurations of interference rings could be used, for example, one or more o-rings. An interference fit is formed between the pin 60n and an interference ring 144 within the pin receiving hole 64n of the ball mount 40n. A formed detent 146 is located on the pin to assist in the location of the pin. As with the spring-biased version, the interference fit version is movable between the raised position and dropped position through the application of an axial force on the pin 60n.

Although, the set screw, plunger pin and interference fit pin designs illustrate two-position pins, with a raised position and a dropped position, each pin could have multiple positions. For example, a pin mechanism with three positions: a raised position, a dropped position, and a centered position, could be used. Such a pin could be centered within the ball mount 40 with both the top and the bottom of the pin being flush with the upper surface 44 and lower surface 45 of the ball mount.

While the different pin embodiments illustrated in FIGS. 28–32 are each shown in use with the ball mounts 40, these pin embodiments could also be adapted to facilitate the movement of any of the pins 60 that are located on the hitch balls 12 or fasteners 50 of various embodiments of the hitch assembly 10. Accordingly, the embodiments that include pins 60 on the hitch ball 12 or nut 50 could use the set screw, threaded, plunger, or interference fit pin mechanisms to move their pins between multiple positions. The movable pins allow the components of the hitch assembly 10 to be used with standard hitch assembly components that do not include anti-rotational features. For example, if a movable pin 60 was located on a hitch ball 12, the pin could be retracted into the hitch ball so the hitch ball could be used with a standard ball mount 40 that does not include a pin opening 64.

Figure 33:
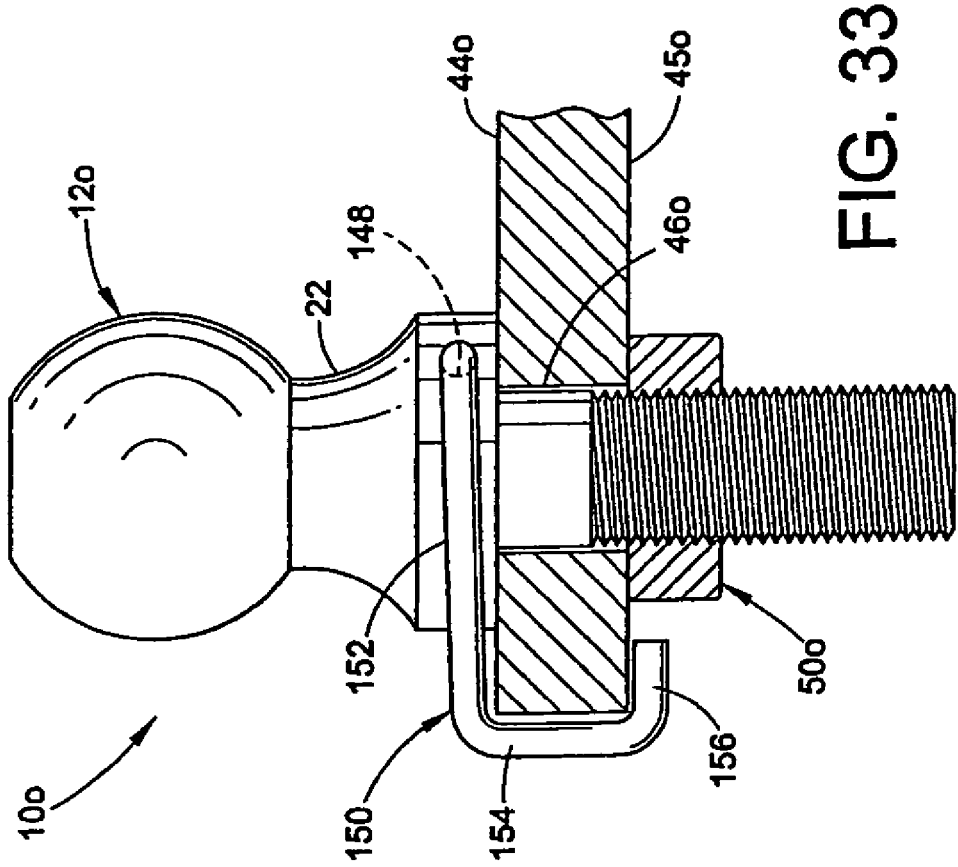
FIG. 33 is a cross-sectional elevation view of the alternative embodiment hitch assembly shown in FIG. 32.
Figure 32:
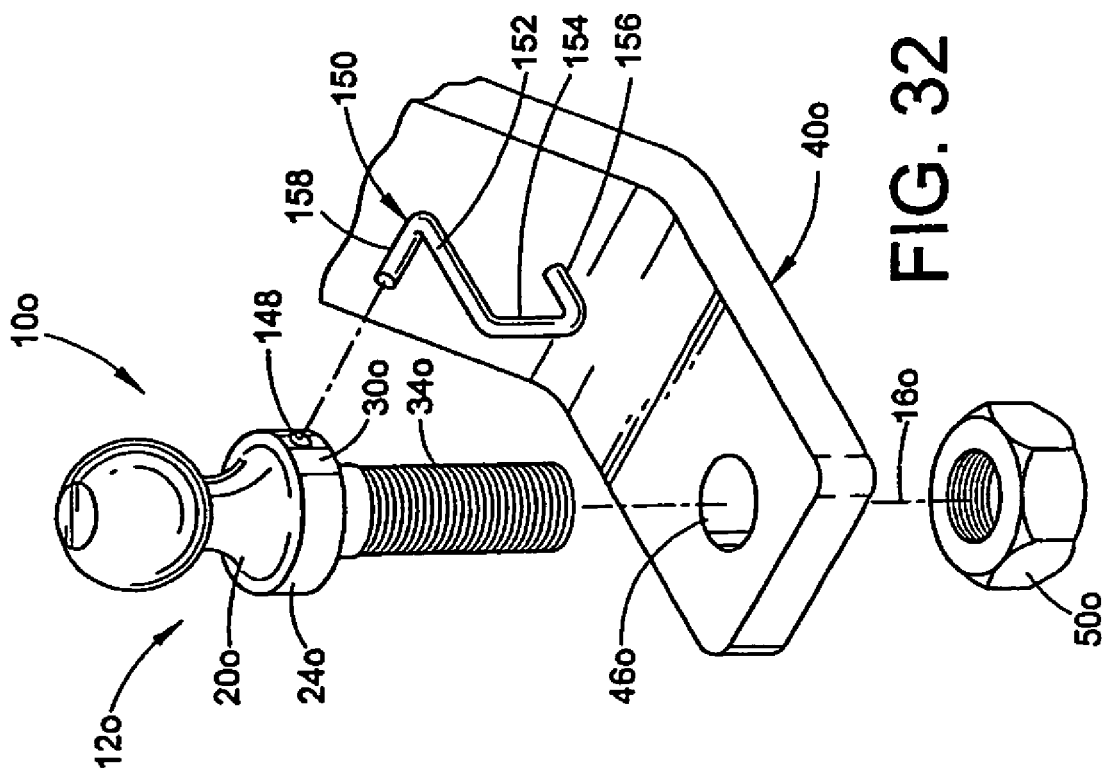
FIG. 32 is an exploded perspective view of an alternative embodiment hitch assembly including a blocking arm.

FIGS. 32–33 illustrate a hitch assembly 10o constructed in accordance with another embodiment of the invention. The hitch assembly 10o (FIGS. 32–33) includes a hitch ball 12o with a flange 20o having a cylindrical section 24o with a cylindrical outer side surface 30o. A blocking arm opening, or bore, 148 is formed in the outer side surface 30o. The opening 148 extends radially inward from the surface 30o in a direction toward the axis 16o. In the illustrated embodiment, the opening 148 has a cylindrical configuration but other shaped openings could be used.

The hitch assembly 10o also includes a blocking arm 150. The blocking arm 150 is a member that is engageable with the hitch ball 12o and with the ball mount 40o, in a different manner than as described above, to block rotation of the hitch ball relative to the ball mount.

The blocking arm 150 in the illustrated embodiment is a single piece of cylindrical metal rod bent to form a three-dimensional (non-planar) configuration which, as illustrated, includes four legs 152, 154, 156 and 158. Three of the legs 152, 154 and 156 are arranged so that they wrap fairly closely around the ball mount 40o. The fourth leg 158 of the blocking arm 150 is arranged so that when the three legs 152–156 are wrapped around the ball mount 40o, the fourth leg extends laterally into the blocking arm opening 148 in the hitch ball 12o.

The blocking arm 150 is inserted into the blocking arm opening 148 in the hitch ball 12o, and wrapped around the ball mount 40o, after the shank portion 34o of the hitch ball is inserted into the shank opening 46o of the ball mount. The engagement of the blocking arm 150 in the opening 148 of the hitch ball 12o, when the blocking arm is wrapped around the ball mount 40o, blocks rotation of the hitch ball relative to the ball mount. After the nut 50o is tightened, the blocking arm 150 can be removed. The blocking arm is not limited to the configuration or shape of the embodiment illustrated in FIG. 32–33. The blocking arm could have a variety of cross-sectional shapes, such as a bent rod with a rectangular cross-section. In addition the blocking arm could also be configured in many different ways, such as member bent into a L-shape that engaged with the hitch ball 12 and the ball mount 40.

We claim:

1. A hitch assembly comprising:
   a hitch ball comprising a flange defining a top surface, a bottom surface, and an outer side surface and at least one pin opening defined within the outer side surface;
   a ball mount adapted for receiving the hitch ball; wherein the ball mount comprises an upper side surface and at least one pin opening defined within the upper side surface; and
   a pin that engages both the at least one pin opening in the hitch ball and the at least one pin opening in the ball mount, thereby inhibiting rotational movement of the hitch ball relative to the ball mount.

2. A hitch assembly according to claim 1 wherein the pin is affixed within the at least one pin opening defined within the hitch ball.

3. A hitch assembly according to claim 1 wherein the pin is affixed within the at least one pin opening defined within the ball mount.

4. A hitch assembly comprising:
   a hitch ball having a flange defining a top surface, a bottom surface, and an outer side surface and a pin engaging recess defined by said outer side surface;
   a ball mount adapted for receiving said hitch ball, said ball mount having at least one pin; and
   wherein said pin engages said pin engaging recess, thereby inhibiting rotational movement of said hitch ball relative to said ball mount.

5. The hitch assembly of claim 4 wherein said pin engaging recess is concave.

6. The hitch assembly of claim 4 wherein said pin engaging recess and said pin are contiguous.

7. A hitch ball adapted for mounting to a ball mount having an extending pin, said hitch ball comprising:
   a ball; and
   a base integrally formed to said ball and defining a top surface, a bottom surface, and an outer side surface, said outer side surface defining a pin engaging recess;
   wherein said pin engaging recess is adapted to engage said pin, thereby inhibiting rotational movement of said hitch ball relative to said ball mount.

8. The hitch ball of claim 7 wherein said pin engaging recess is concave.

9. A method of attaching a hitch ball to a ball mount comprising:
   inserting a hitch ball having a top surface, a bottom surface, an outer side surface defined between said top and bottom surfaces, and a shank into a ball mount shank opening;
   aligning a pin engaging recess defined by said outer side surface of said hitch ball with a pin extending from an upper surface of said ball mount; and
   engaging said pin with said pin engaging recess.

10. The method of claim 9 further comprising visually verifying said pin is engaged with said pin engaging recess by observing a portion of said pin enclosed within said pin engaging recess.

11. The method of claim 9 further comprising attaching a fastener to said shank of said hitch ball.

\* \* \* \* \*